Oct. 6, 1964  E. T. DUMITRU  3,152,203
PREPARATION OF COLLAGEN FILMS
Filed May 31, 1961
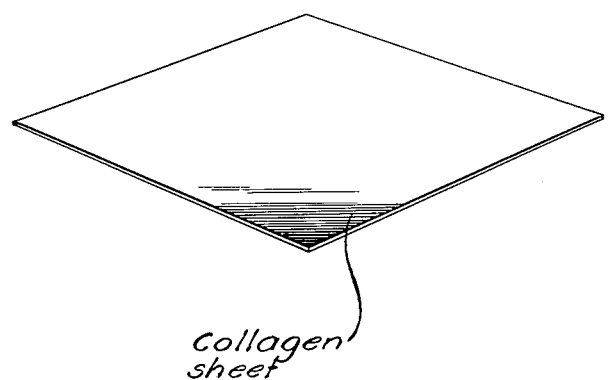
Collagen sheet
INVENTOR.
Earl T. Dumitru
BY
Griswold & Burdick
ATTORNEYS 3,152,203
PREPARATION OF COLLAGEN FILMS
Earl T. Dumitru, Midland, Mich., assignor to The Dow Chemical Company, Midland, Mich., a corporation of Delaware
Filed May 31, 1961, Ser. No. 113,727
3 Claims. (Cl. 264—212)

This invention relates to a method for preparing films or collagen and to the novel and useful films resulting from the practice of the method.

Collagen finds use in biological research as a substrate in cell culture. Desirably, for such use the material should be supplied in the form of thin, handleable sheets. However, there has not heretofore been available a method for the production of a sheet of sufficient strength and practical size. Attempts to cast such films on a glass surface from an aqueous solution of collagen are unsuccessful inasmuch as the dried collagen adheres tenaciously to the glass and removal of an unbroken collagen film therefrom is virtually impossible.

It has been proposed that a liquid mercury surface be employed as the substrate for formation of the collagen film. This expedient is effective to meet the problem of adhesion to the substrate, but presents its own unique difficulty. The film formed against the mercury surface is badly wrinkled, rendering it generally unsuitable for the intended purpose. Further, it invariably contains occluded particles of mercury that may have a toxic action on cells desired to be grown on its surface.

Accordingly, it is the principal object of the present invention to provide a means whereby a film of collagen of substantial strength and desired thickness may be obtained. It is a further object of the invention to provide a method whereby removal of the collagen film from the substrate against which it is formed is facilitated. It is yet another object of the invention to provide a method of forming a collagen film of desirable smoothness and free of contaminants derived from the substrate. The means of attaining these and other objects of the invention will be apparent from the description following.

It has been discovered that strong, handleable relatively thick films of collagen can be prepared by employing, as the substrate for the casting of the film from an aqueous solution of collagen, a smooth surface of a hydrophobic, resinous material. The dried film resulting from the evaporation of water from the solution may readily be removed from such a substrate without damage thereto. The film thickness may be readily increased to a desired value by depositing an additional layer of solution on the first formed dried film, permitting the evaporation of water therefrom, and repeating this sequence of operations until the desired thickness is attained.

Because of the extremely viscous nature of an aqueous collagen solution, it is preferred to employ quite dilute solutions of this material. In general, a solution containing about 0.3 percent by weight of collagen may be advantageously employed, although a solution containing up to about 0.5 percent of collagen may be employed if desired. The actual value of concentration may, of course, also depend on the presence in the solution of salts having an effect on the viscosity thereof.

Of the various hydrophobic resinous materials adapted to be used as the substrate, polystyrene is representative and is ideally suited to the purpose. Polyethylene, polypropylene, polytetrafluoroethylene and rubber may also advantageously be employed.

The surface of the substrate should, of course, be as smooth and free of defects as possible, since its surface imperfections will be carried over to the cast film.

Advantageously, the film is cast in a flat, shallow container constructed from the substrate material. The collagen solution is poured into the container to the desired depth. Evaporation of water from this solution gives rise to a smooth and unwrinkled film of substantially uniform thickness.

This dried film of collagen is also readily and smoothly wet by the collagen solution. Thus, relatively thick films obtained by casting several succeeding layers are similarly smooth and uniform in thickness.

Because of the ease of conversion of collagen to gelatin at a relatively low temperature, it will be evident to those skilled in the art that evaporation of water from the aqueous layer should be effected at a temperature generally not in excess of about 35° C. Complete dehydration of the film is, of course, not required for the production of the desired film.

The method of the invention is illustrated by the following non-limiting examples.

*Example 1*

A solution of rat tail tendon collagen was prepared according to the method of Dumitru and Garrett, reported in the Archives of Biochemistry and Biophysics, volume 66, No. 1, pages 245–247, January 1957. This solution, containing approximately 0.2 percent by weight of collagen, was poured into a shallow dish constructed of polystyrene to a depth of approximately ⅛ inch. This layer of solution was then allowed to dry at 25° C. for a period of 24 hours. The resulting dry film was readily peeled from the polystyrene surface in an unbroken sheet.

In a similar fashion, a sheet of collagen was formed in a glass container. It adhered strongly to the glass surface and could be removed therefrom only by scraping with a razor blade. It could not be obtained as an unbroken sheet.

*Example 2*

A dried collagen film supported on a polystyrene substrate was prepared according to the method of Example 1. A second layer of collagen solution was spread on the dried film and allowed to dry as described. This operation was repeated until a dried, composite film, measuring about 0.3 mils in thickness was obtained. This film was readily peeled from the polystyrene surface in the form of a strong, continuous, substantially wrinkle-free sheet.

*Example 3*

In the manner of Example 2, handleable, substantially wrinkle-free sheets of dry collagen are obtained when surfaces of polyethylene, polypropylene, polytetrafluoroethylene or rubber are employed as substrates for the initial collagen layer.

The accompanying drawing represents a section of a sheet of collagen obtained by the method of the present invention.

What is claimed is:

1. A method for the preparation of sheet form collagen, which method comprises depositing a layer of an aqueous 0.2 to 0.5 weight percent solution of collagen derived from rats on a substrate comprising a smooth surface of a hydrophobic, resinous material, selected from the group consisting of polystyrene, polyethylene, polypropylene, polytetrafluoroethylene and rubber, drying the layer to a continuous film and removing said dried film from said substrate.

2. A method for the preparation of sheet form collagen, which method comprises depositing a layer of an aqueous 0.2 to 0.5 weight percent solution of collagen derived from rats on a substrate comprising a smooth surface of polystyrene, drying the deposited layer by evaporation of water therefrom at a temperature not in excess of about 35° C. to a continuous film and removing said dried film from said substrate.

3. A method for the preparation of sheet form collagen, which method comprises depositing a layer of an aqueous 0.2 to 0.5 weight percent solution of collagen derived from rats on a substrate comprising a smooth surface of polystyrene, drying the deposited layer by evaporation of water therefrom at a temperature not in excess of about 35° C. to a continuous film, depositing at least one additional layer of said aqueous solution of collagen on said film, drying said additional layer by evaporation of water therefrom at a temperature not in excess of said stated temperature to a continuous film, and removing said film from said substrate.

References Cited in the file of this patent

UNITED STATES PATENTS

| | | |
|---|---|---|
| 1,656,681 | Samuel | Jan. 17, 1928 |
| 2,070,596 | Hansen | Feb. 16, 1937 |
| 2,747,228 | Braun et al. | May 29, 1956 |
| 2,935,413 | Veis et al. | May 3, 1960 |
| 2,981,997 | Painter | May 2, 1961 |
| 3,014,024 | Lieberman et al. | Dec. 19, 1961 |
| 3,036,341 | Taylor | May 29, 1962 |
| 3,071,483 | Tung Tu | Jan. 1, 1963 |